Patented Dec. 23, 1941

2,266,824

UNITED STATES PATENT OFFICE 2,266,824

INSOLUBLE AZO DYE

Chiles E. Sparks, Wilmington, and James W. Libby, Jr., Claymont, Del., assignors to E. I. du Pont de Nemours & Company, Wilmington, Del., a corporation of Delaware No Drawing. Original application July 12, 1940, Serial No. 345,170. Divided and this application January 25, 1941, Serial No. 375,920

14 Claims. (Cl. 260—159)

This invention relates to new insoluble azo compositions, and especially to compositions with dyeable fibers and to processes of making the same. More particularly the said azo compositions comprise essentially a diazo component which before tetrazotization is a diazo compound substituted by two amino groups, is soluble and is substantive to cellulosic fibers, such as cotton, regenerated cellulose and similar dyeable fibers. When tetrazotized, coupling can be effected with suitable coupling components to produce colored compositions in substance; and when it is dyed on dyeable fibers, tetrazotized thereon and coupled with suitable coupling components, excellent dyed fibers are produced. The first components can be represented by the symbol $x \rightarrow y_2$ in which $x$ consists of a type of phenoxyalkacyl-diamines and the second components of the diazo component can be represented by the symbol $y$ which consist of a type of arylamines. The insoluble compounds are tetrakisazo compounds which result from tetrazotizing the diamino-disazo compounds and coupling with suitable coupling components.

Various disazo compounds having substantivity for cotton and regenerated cellulose and which can be tetrazotized on the fiber and coupled with coupling components to form dyeings of excellent fastness and good insolubility are known, but in general the dyeings developed from such substantive tetrazotizable compounds do not have as good brightness as is desired.

It is among the objects of the present invention to provide insoluble tetrakisazo compounds and developed dyeings in bright shades, improved washing fastness, good discharge properties and other properties desired in such dyeings. Another object of the invention is to provide processes for manufacturing such compositions. Still other objects will be apparent from the following description.

The objects of the invention are attained in general by providing a compound $x \rightarrow y_2$ which is substituted by an amino group in each of the Y components, tetrazotizing this compound and coupling with an azo dye coupling component which is devoid of solubilizing groups.

In the general formula $x$ is a compound of the group represented by the formulae

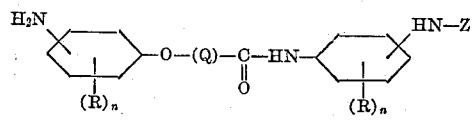

and

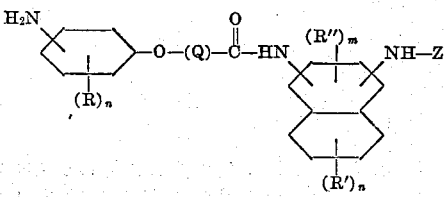

in which Q is the radical of a straight or branched chain aliphatic hydrocarbon compound containing 1 to 6 carbon atoms in the chain; R is from a group consisting of hydrocarbon, alkyl, alkoxy, halogen, sulfonic acid and carboxyl; $n$ is 1 to 2; R' is from a group consisting of hydrogen, halogen, sulfonic acid and carboxy; Z is one of a group consisting of hydrogen and the group

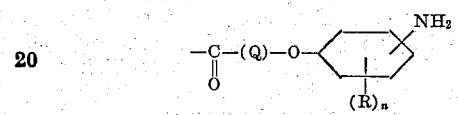

R'' is one of a group consisting of hydrogen, halogen, alkyl and alkoxy; and $m$ is 1 to 2.

The symbol $y$ in the general formula represents amine substituted coupling components of the benzene and naphthalene series represented by the formula

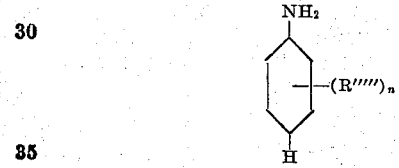

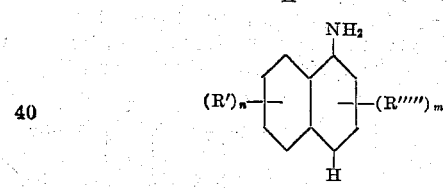

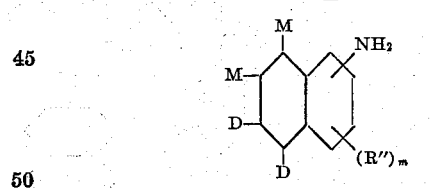

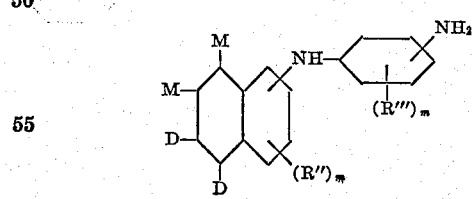

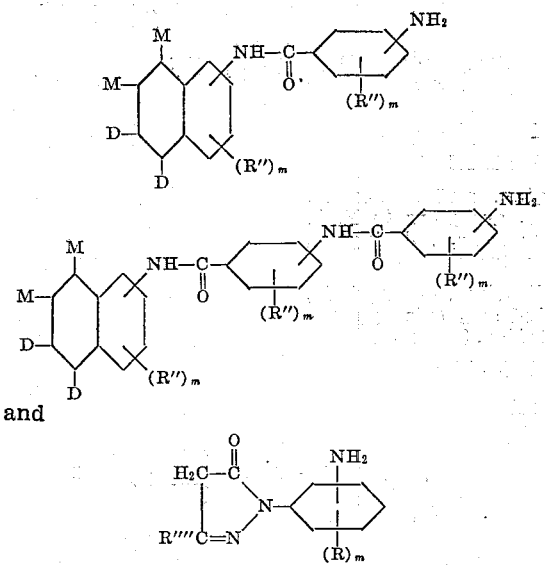

and

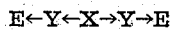

in which R, R' and R" represent the groups above described; H— represents an open coupling position; R'" is one of a group consisting of hydrogen, carboxy and sulfonic acid; R"" is one of a group consisting of methyl and carboxyl; R""' is one of a group consisting of hydrogen, alkyl and alkoxy; one D is hydroxy and the other is hydrogen; M which is meta to hydroxy is sulfonic acid and the other M is hydrogen. The components of the above types must be chosen so that the disazo diamino compound contains at least one solubilizing group, such as carboxyl or sulfonic acid, but more than one solubilizing group may be present. The insoluble compounds are represented by the general formula $$E \leftarrow Y \leftarrow X \rightarrow Y \rightarrow E$$

in which E is an azo dye coupling component which is devoid of solubilizing groups.

The invention will be more fully set forth in the following more detailed description which includes examples that are given as illustrative embodiments of the invention and not as limitations thereof. Parts are expressed in parts by weight unless otherwise noted.

*Example I*

A slurry was made by adding 12.9 parts of 3-(4'-amino-phenoxy-acetylamino)-1-aminobenzene to 300 parts of water and 9.1 parts of hydrochloric acid were added with stirring until the solids were completely in solution. The solution was cooled to 0° C. by adding ice and then tetrazotized by adding 6.9 parts of sodium nitrite with agitation. A temperature of 0-5° C. and a distinct test for excess nitrite were maintained for one-half hour.

A solution which gave a mild test for alkali on Brilliant Yellow paper was made by dissolving 37.7 parts of 2-(3'-amino-benzoylamino)-5-naphthol-7-sulfonic acid in 400 parts of water and adding ammonia. This solution was cooled to 0° C. and 31.8 parts of soda ash were added. While maintaining good agitation and the temperature between 0° and 5° C. the solution of the tetrazo was slowly added to this solution and the mixture was stirred one hour after all the tetrazo has been added.

The product was isolated by heating to 60°–65° C. and slowly salting to 5% on the volume. After salting the solution was stirred one-half hour longer and filtered. The filter cake was dried in an oven at 70° C.

The compound is represented by the formula

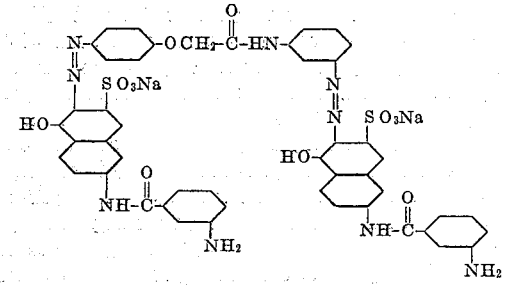

Five parts of cotton piece goods were entered in a water solution containing one-tenth part of the dye and dyed in the usual manner. The dyed fabric was rinsed in cold water and put into 200 parts of water at 20° C. The compound was tetrazotized on the fiber by the action of three-tenths parts of sodium nitrite and four-tenths parts of sulfuric acid which were dissolved in the water and the dyed fabric was then rinsed in cold water. One-tenth part of beta-naphthol was dissolved in 200 parts of water and one-twentieth part of caustic soda. For development, the rinsed piece was entered into this solution with rapid stirring. After 15 minutes it was removed, rinsed in cold water and dried. The dyeing was a bright scarlet shade with excellent washing fastness and discharge properties. The compound is represented by the formula

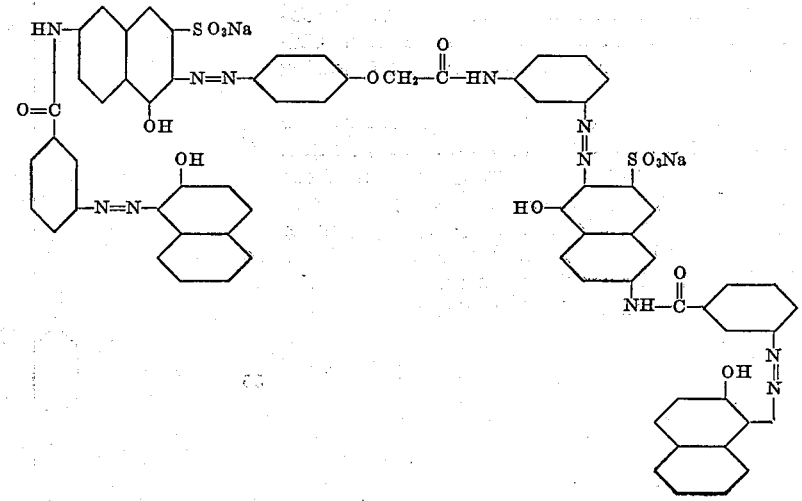

Example II

By following the procedure of Example I and using 12.9 parts of 4-(4'-amino-phenoxy-acetyl-amino)-1-amino benzene instead of 12.9 parts of 3-(4'-amino-phenoxy-acetylamino)-1-amino-benzene the product was produced which is represented by the formula

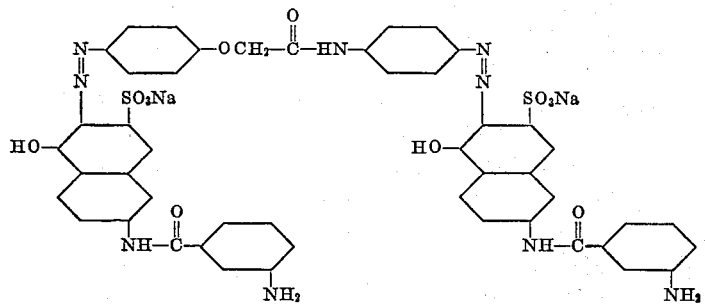

When dyed on cotton fiber and developed with beta-naphthol in the usual way, the dyeing was a bright red shade with excellent washing fastness and discharge properties. The compound is represented by the formula

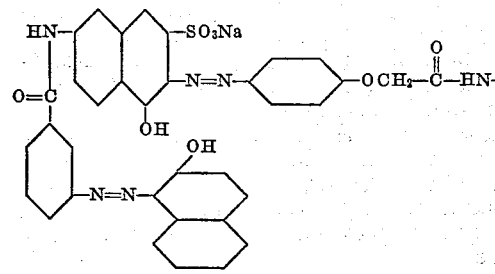 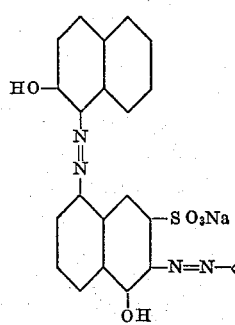 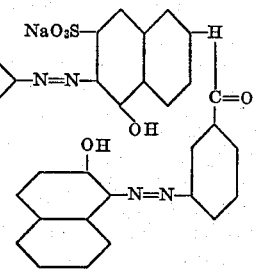

Example III

When following the procedure of Example I and using 25.2 parts of 1-amino-5-naphthol-7-sulfonic acid in place of 37.7 parts of 2-(3'-amino-benzoylamino)-5-naphthol-7-sulfonic acid the product represented by the following formula was produced.

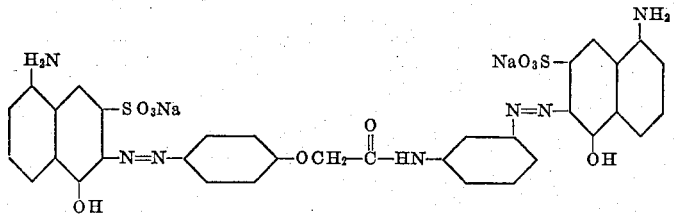

When dyed on cotton fiber and developed with beta-naphthol in the usual way the dyeing was a rubine shade with excellent washing fastness and discharge properties. The compound is represented by the formula Other compounds set forth in the following examples have been prepared by methods similar to those of the foregoing examples. However, it is to be understood that the method of preparation of these compounds as well as those of the foregoing examples is not limited by the specific details heretofore particularized, and that modifications in the details of such methods which are understood by those skilled in the art can be made.

| Example | Combination | Developed with— | Shade |
|---|---|---|---|
| IV | 4-(4'-amino-phenoxy-acetylamino)-1-amino-benzene ⇌ (1-(3'-aminophenyl)-5-pyrazolone-3-carboxylic acid)₂. | Beta naphthol | Orange. |
| V | 4-(4'-amino-phenoxy-acetylamino)-1-amino-benzene ⇌ (2-(4'-amino-3'-sulfo-phenylamino)-5-naphthol-7-sulfonic acid)₂. | ___do___ | Violet. |
| VI | 3-(4'-amino-phenoxy-acetylamino)-1-amino-benzene ⇌ (1-(3'-aminophenyl)-5-pyrazolone-3-carboxylic acid)₂. | ___do___ | Orange. |
| VII | 3-(4'-amino-phenoxy-acetylamino)-1-amino-benzene ⇌ (2-(4'-amino-3'-sulfo-phenylamino)-5-naphthol-7-sulfonic acid)₂. | ___do___ | Violet. |
| VIII | 4-(4'-amino-phenoxy-acetylamino)-1-naphthalene ⇌ (1-(3'-aminophenyl)-5-pyrazolone-3-carboxylic acid)₂. | ___do___ | Red. |
| IX | 4-(4'-amino-phenoxy-acetylamino)-1-amino-naphthalene ⇌ (2-(4'²-amino-3'-sulfo-phenylamino)-5-naphthol-7-sulfonic acid)₂. | ___do___ | Violet. |
| X | 1,3-di-(4'-amino-phenoxy-acetylamino)-benzene ⇌ (1-(3'-aminophenyl)-5-pyrazolone-3-carboxylic acid)₂. | ___do___ | Orange. |
| XI | 1,3-di-(4'-amino-phenoxy-acetylamino)-benzene ⇌ (2-(4'-amino-3'-sulfo-phenylamino)-5-naphthol-7-sulfonic acid)₂. | ___do___ | Violet. |
| XII | 1,4-di-(4'-amino-phenoxy-acetylamino)-naphthalene-6-sulfonic acid ⇌ 2-(3'-amino-benzoylamino)-5-naphthol-7-sulfonic acid)₂. | ___do___ | Red brown. |
| XIII | 1,4-di-(4'-amino-phenoxy-acetylamino)-naphthalene-6-sulfonic acid ⇌ (2-amino-5-naphthol-7-sulfonic acid)₂. | ___do___ | Violet. |
| XIV | 1,3-di-(4'-amino-phenoxy-acetylamino)-benzene-5-sulfonic acid ⇌ (1-(3'-amino-phenyl)-5-pyrazolone-3-carboxylic acid)₂. | ___do___ | Orange. |
| XV | 1,3-di-(4'-amino-phenoxy-acetylamino)-benzene-5-sulfonic acid ⇌ (2-(4'-amino-3'-sulfo-phenylamino)-5-naphthol-7-sulfonic acid)₂. | ___do___ | Violet. |
| XVI | 1,3-di-(4'-amino-phenoxy-acetylamino)-benzene-5-sulfonic acid ⇌ (2-(3'-amino-benzoylamino)-5-naphthol-7-sulfonic acid)₂. | ___do___ | Scarlet. |
| XVII | 1,3-di-(4'-amino-phenoxy-acetylamino)-benzene-5-sulfonic acid ⇌ (2-amino-5-naphthol-7-sulfonic acid)₂. | ___do___ | Chocolate brown. |
| XVIII | 1,3-di-(4'-amino-phenoxy-acetylamino)-benzene-5-sulfonic acid ⇌ (1-amino-5-naphthol-7-sulfonic acid)₂. | ___do___ | Rubine. |
| XIX | 4-(4'-amino-phenoxy-acetylamino)-1-amino-benzene ⇌ (2-(3'-amino-benzoylamino)-5-naphthol-7-sulfonic acid)₂. | ___do___ | Red. |
| XX | 4-(4'-amino-phenoxy-acetylamino)-1-amino-benzene ⇌ (1-amino-5-naphthol-7-sulfonic acid)₂. | ___do___ | Rubine. |
| XXI | 4-(4'-amino-phenoxy-acetylamino)-1-amino-benzene ⇌ (2-amino-5-naphthol-7-sulfonic acid)₂. | ___do___ | Chocolate brown. |
| XXII | 3-(4'-amino-phenoxy-acetylamino)-1-amino-benzene ⇌ (2-(3'-amino-benzoylamino)-5-naphthol-7-sulfonic acid)₂. | ___do___ | Scarlet. |
| XXIII | 3-(4'-amino-phenoxy-acetylamino)-1-amino-benzene ⇌ (1-amino-5-naphthol-7-sulfonic acid)₂. | ___do___ | Rubine. |
| XXIV | 3-(4'-amino-phenoxy-acetylamino)-1-amino-benzene ⇌ (2-amino-5-naphthol-7-sulfonic acid)₂. | ___do___ | Do. |
| XXV | 4-(4'-amino-phenoxy-acetylamino)-1-amino-naphthalene ⇌ (2-(3'-amino-benzoylamino)-5-naphthol-7-sulfonic acid)₂. | ___do___ | Bordeaux. |
| XXVI | 4-(4'-amino-phenoxy-acetylamino)-1-amino-naphthalene ⇌ (1-amino-5-naphthol-7-sulfonic acid)₂. | ___do___ | Violet. |
| XXVII | 4-(4'-amino-phenoxy-acetyl-amino)-naphthalene ⇌ (2-amino-5-naphthol-7-sulfonic acid)₂. | ___do___ | Do. |
| XXVIII | 1,3-di-(4'-amino-phenoxy-acetylamino)-benzene ⇌ (2-(3'-amino-benzoyl-amino)-5-naphthol-7-sulfonic acid)₂. | ___do___ | Red. |
| XXIX | 1,3-di-(4'-amino-phenoxy-acetylamino)-benzene ⇌ (2-amino-5-naphthol-7-sulfonic acid)₂. | ___do___ | Red violet. |
| XXX | 1,3-di-(4'-amino-phenoxy-acetylamino)-benzene ⇌ (1-amino-5-naphthol-7-sulfonic acid)₂. | ___do___ | Violet. |
| XXXI | 1-(4'-amino-phenoxy-acetylamino)-4-amino-benzene ⇌ [1-(3'-aminophenyl)-5-pyrazolone-3-carboxylic acid]₂. | Phenyl-methyl-pyrazolone. | Red yellow. |
| XXXII | ___do___ | Meta-toluylene-diamine | Red brown. |
| XXXIII | ___do___ | Aceto-acetanilide | Red yellow. |
| XXXIV | 1-(4'-amino-phenoxy-acetylamino)-3-amino-benzene ⇌ [2-(3'-amino-benzoylamino)-5-naphthol-7-sulfonic acid]₂. | Phenylmethyl-pyrazolone. | Scarlet. |
| XXXV | ___do___ | Metatoluylene-diamine | Red. |
| XXXVI | ___do___ | Aceto-acetanilide | Scarlet. |
| XXXVII | 1-(4'-amino-phenoxy-acetylamino)-4-amino-benzene ⇌ (1-amino-5-naphthol-7-sulfonic acid)₂. | Phenylmethyl-pyrazolone. | Red brown. |
| XXXVIII | ___do___ | Metatoluylene-diamine | Brown. |
| XXXIX | ___do___ | Aceto-acetanilide | Red brown. |
| XL | 1-(4'-amino-phenoxy-acetylamino)-3-amino-benzene ⇌ [2-(4'-amino-3'-sulfo-phenylamino)-5-naphthol-7-sulfonic acid]₂. | Phenylmethyl-pyrazolone. | Bordeaux. |
| XLI | ___do___ | Metatoluylene-diamine | Violet. |
| XLII | 1-(4'-amino-phenoxy-acetylamino)-3-amino-benzene ⇌ [2-(4'-amino-3'-sulfo-phenylamino)-5-naphthol-7-sulfonic acid]₂. | Aceto-acetanilide | Bordeaux. |

As other illustrations of $x$ components which can be used to make compounds having properties similar to the foregoing, the following are mentioned: 3-(4'-amino-phenoxy-acetylamino)-1-aminobenzene, 4-(3'-amino-phenoxy-acetylamino)-1-aminobenzene, 1,3-di(4'-amino-phenoxy-acetylamino)-benzene, 3-(alpha-(4'-amino-2'-methoxy-phenoxy)-propionyl-amino)-1-aminobenzene, 4-(alpha-(5'-amino-2'-methyl-phenoxy)-butyryl-amino)-1-aminobenzene, 4-(4'-amino-phenoxy-acetylamino)-1-amino-naphthalene, 1,4-di-(3'-amino-phenoxy-acetylamino)-naphthalene-7-sulfonic acid, 3-(4'-amino-2'-chloro-phenoxy-acetylamino)-1-amino-benzene, 3-[alpha-(2'-methyl-4'-amino-phenoxy-propionylamino)]-1-amino-benzene-3-sulfonic acid, 3-[beta-(2'-sulfo-4'-amino-phenoxy-propionyl-amino)]-1-amino-benzene, 4-[gamma-(2'-carboxy-4'-amino-phenoxy-butyryl-amino)]-1-amino-benzene, 4-[alpha-(3'-chloro-4'-amino-phenoxy-caproyl-amino)]-1-amino-2,5-dimethoxy-benzene, 1,3-di(2'-chloro-4'-amino-5'-methyl-phenoxy-acetylamino)-benzene, 1-(4'-amino-phenoxy-acetylamino)-2-methoxy-4-amino-naphthalene-6-sulfonic acid, 1,4-di[alpha-(3'-amino-phenoxy-butyrylamino)]-naphthalene-5-carboxylic acid, 1-(4'-amino-phenoxy-acetylamino)-4-amino-5-methoxy-naphthalene-7-sulfonic acid, 2-(3'-amino-phenoxy-acetylamino)-4-amino-naphthalene-6-sulfonic acid, 1-(4'-amino-phenoxy-acetylamino)-4-amino-8-chloro-naphthalene-6-carboxylic acid, 1-(3'-amino-6''-methyl-phenoxy-acetylamino)-3-amino-benzene-5-carboxylic acid, 1-[alpha-(4'-amino-phenoxy-acetylamino)]-4-amino-2,5-dichloro-benzene and 1-(2'-amino-phenoxy-acetylamino)-3-amino-benzene.

As other illustrations of $y$ components which can be used to practice the invention heretofore set forth, the following are mentioned: 1-amino-3-methyl-benzene, 1-amino-naphthalene-6-sulfonic acid, 2-amino-5-naphthol-7-sulfonic acid, 1-amino-5-naphthol-7-sulfonic acid, 2-amino-8-naphthol-6-sulfonic acid, 2-amino-8-naphthol-3,6-disulfonic acid, 1-(4'-amino-3'-sulfo-phenyl-amino)-5-naphthol-7-sulfonic acid, 1-(3'-aminobenzoyl-amino)-5-naphthol-7-sulfonic acid, 1-(3'-amino-phenyl)-5-pyrazolone-3-carboxylic acid, aniline, 1-amino-2-methoxy-5-methyl-benzene, 1-amino-2-methoxy-naphthalene-6-sulfonic acid, 1-amino-8-chloro-naphthalene-6-sulfonic acid, 1-amino-naphthalene-6-carboxylic acid, 2-amino-3-methyl-5-naphthol-7-sulfonic acid, 2-(4'-amino-3'-methyl-5'-sulfo-phenylamino)-5-naphthol-7-sulfonic acid, 2-(3'-amino-5'-sulfo-phenylamino)-5-naphthol-7-sulfonic acid, 2-(3'-amino-4'-ethoxy-benzoylamino)-5-naphthol-7-sulfonic acid, 2-(3'-amino-4'-propoxy-5'-chloro-benzoylamino)-5-naphthol-7-sulfonic acid, 1-3'-amino-5'-carboxy-phenyl)-5-pyrazolone-3-carboxylic acid, 1-(3'-amino-5'-sulfo-phenyl)-5-pyrazolone-3-carboxylic acid, 1-(3'-amino-4'-chloro-5'-ethyl-phenyl)-5-pyrazolone-3-carboxylic acid, 1-(3'-amino-5'-bromo-benzoylamino)-5-naphthol-7-sulfonic acid, 1-(4'-amino-phenyl)-5-methyl-pyrazolone, and 2-(4'-methoxy-3'-amino-benzoylamino)-5-naphthol-7-sulfonic acid.

The preferred embodiments of the invention are those in which the bridging group of the x component contains the acetylamino group and of these the modifications in which both arylamino radicals are aminobenzene are preferred.

When the soluble diamino disazo compounds are tetrazotized and developed on the fiber the preferred coupling component is beta naphthol, but any azo dye coupling component which is devoid of solubilizing groups, such as carboxy and sulfonic acid, can be used. For example, other naphthols such as alpha naphthol, phenylpyrazolones such as 1-phenyl-3-methyl-5-pyrazolone, acylacetarylides such as acetoacetanilide, and meta-phenylene diamines such as meta-toluylene diamine can be used. Insoluble colors can be made by carrying out in substance the tetrazotization of the diamino disazo compound and the coupling with any of the described coupling components.

When the amino bases of the invention are tetrazotized and developed on fiber, such as cotton or regenerated cellulose with the described coupling components, a variety of shades can be produced and the dyeings in general have excellent washing fastness and good discharge properties.

This is a division of our application Serial Number 345,170 filed July 12, 1940.

From the foregoing disclosure it will be recognized that the invention is susceptible of modification without departing from the spirit and scope thereof and it is to be understood that the invention is not restricted to the specific illustrations thereof herein set forth.

We claim:
1. A compound which in the form of its acid is represented by the formula E←Y←X→Y→E in which X is a compound of the group represented by the formulae

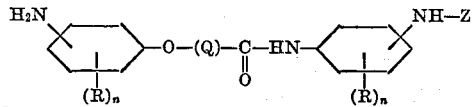

and

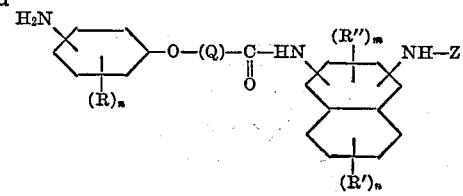

wherein Q represents a radical of the straight and branched chain aliphatic hydrocarbons containing 1 to 6 carbon atoms in the chain; R is from the group consisting of hydrogen, alkyl having 1 to 6 carbons, the corresponding alkoxy groups carboxy, sulfonic acid and halogen; R' is from the group consisting of hydrogen, halogen, carboxyl and sulfonic acid; $n$ is 1 to 2; Z is one of a group consisting of hydrogen and the group represented by the formula

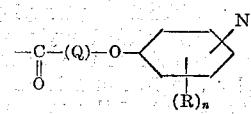

and R'' is from the group consisting of hydrogen, halogen, alkyl having 1 to 6 carbons and the corresponding alkoxy groups; $m$ is 1 to 2; and Y is one of a group represented by the formulae

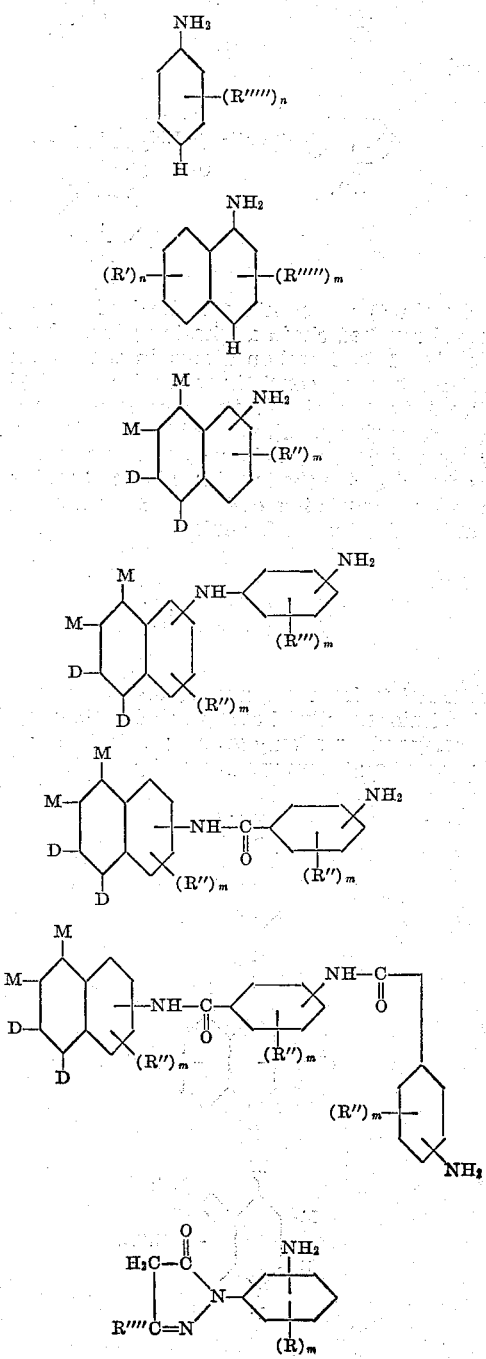

and in which -H represents an open coupling position; R''' is one of a group consisting of hydrogen, carboxy and sulfonic acid; R'''' is one of a group consisting of methyl and carboxy; R''''' is one of a group consisting of hydrogen, alkyl and alkoxy; one D is hydroxy and the other is hydrogen; and M which is meta to hydroxy, is sulfonic acid and the other is hydrogen; and each E is an azo dye coupling component which is devoid of solubilizing groups from the group consisting of naphthols, phenyl-pyrazolones, acylacetarylides and meta-phenylene diamines.

2. A compound which in the form of its acid is represented by the formula E←Y←X→Y→E in which X is a compound of the group represented by the formulae

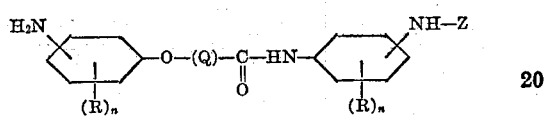

and

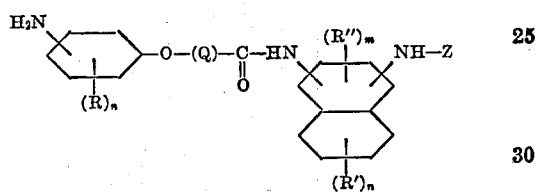

wherein Q represents a radical of the straight and branched chain aliphatic hydrocarbons containing 1 to 6 carbon atoms in the chain; R is from the group consisting of hydrogen, alkyl having 1 to 6 carbons, the corresponding alkoxy groups carboxy, sulfonic acid and halogen; R' is from the group consisting of hydrogen, halogen, carboxyl and sulfonic acid; $n$ is 1 to 2; Z is one of a group consisting of hydrogen and the group represented by the formula

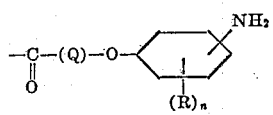

and R'' is from the group consisting of hydrogen, halogen, alkyl having 1 to 6 carbons and the corresponding alkoxy groups; $m$ is 1 to 2; and Y is one of a group represented by the formulae

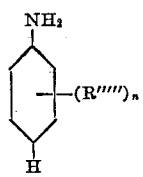

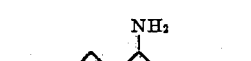

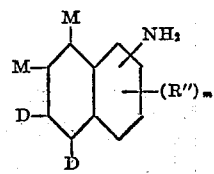

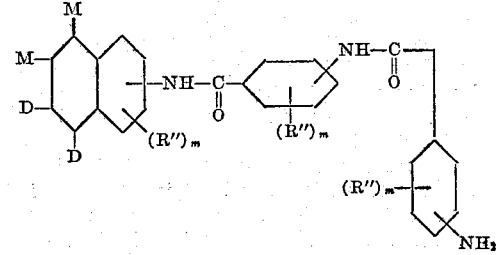

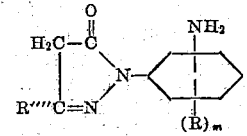

and

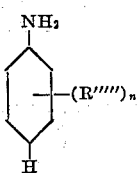

in which —H represents an open coupling position; R''' is one of a group consisting of hydrogen, carboxy and sulfonic acid; R'''' is one of a group consisting of methyl and carboxy; R''''' is one of a group consisting of hydrogen, alkyl and alkoxy; one D is hydroxy and the other is hydrogen; and M which is meta to hydroxy, is sulfonic acid and the other is hydrogen; and E is beta naphthol.

3. A compound which in the form of its acid is represented by the formula

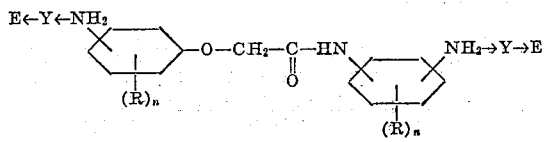

in which R is from the group consisting of hydrogen, alkyl having 1 to 6 carbons, the corresponding alkoxy groups carboxy, sulfonic acid and halogen; $n$ is 1 to 2; and Y is one of a group represented by the formula

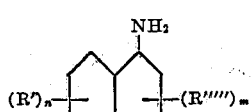

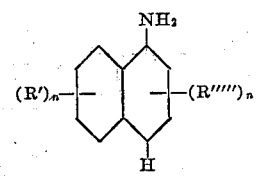

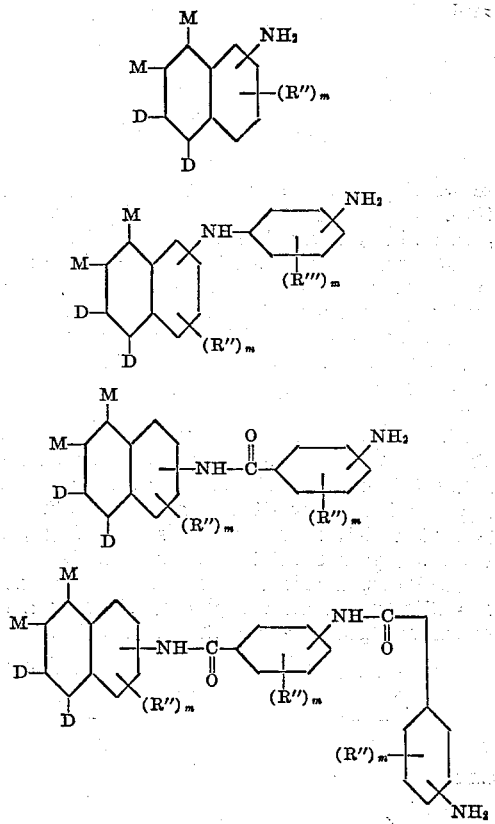

4. The compound represented by the formula

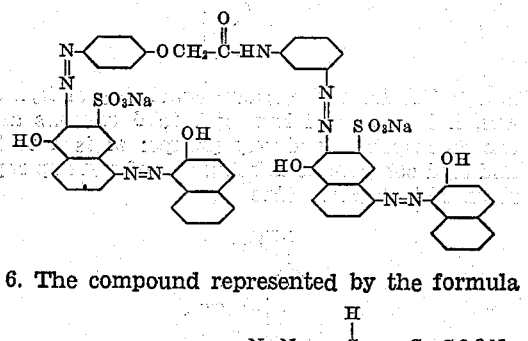

5. The compound represented by the formula

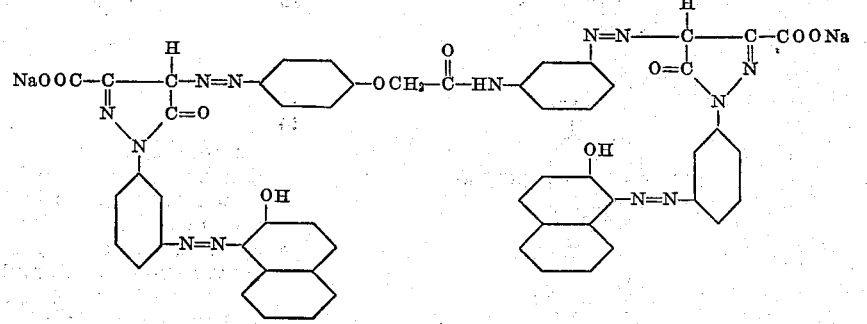

6. The compound represented by the formula and

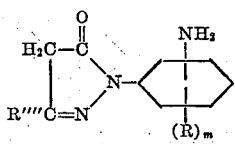

in which —H represents an open coupling position; R' is from the group consisting of hydrogen, halogen, carboxyl and sulfonic acid; R'' is from a group consisting of hydrogen, halogen, alkyl having 1 to 6 carbons and the corresponding alkoxy groups; R''' is one of a group consisting of hydrogen, carboxy and sulfonic acid; R'''' is one of a group consisting of methyl and carboxy; R''''' is one of a group consisting of hydrogen, alkyl and alkoxy; one D is hydroxy and the other is hydrogen; M which is meta to hydroxy is sulfonic acid and the other is hydrogen; $m$ is 1 to 2; and each E is an azo dye coupling component which is devoid of solubilizing groups from the group consisting of naphthols, phenylpyrazolones, acylacetarylides and metaphenylene diamines.

7. Cellulosic fibers dyed with a compound of claim 1.
8. Cellulosic fibers dyed with a compound of claim 2.
9. Cellulosic fibers dyed with a compound of claim 3.
10. Cellulosic fibers dyed with a compound of claim 4.
11. Cellulosic fibers dyed with a compound of claim 5.
12. Cellulosic fibers dyed with a compound of claim 6.
13. The process which comprises tetrazotizing a compound represented by the general formula Y←X→Y and coupling with an azo dye coupling component which is devoid of solubilizing groups from a group consisting of naphthols, phenylpyrazolones, acyl-acetarylides and meta-phenylene diamines, said component X being a compound of a group represented by the formulae

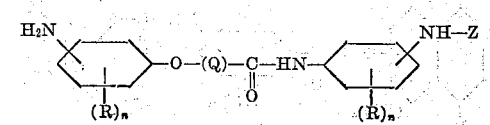

and

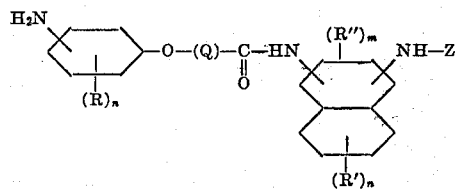

wherein Q represents a radical of the straight and branched chain hydrocarbons containing 1 to 6 carbon atoms in the chain; R is from the group consisting of hydrogen, alkyl having 1 to 6 carbons, the corresponding alkoxy groups carboxy, sulfonic acid, and halogen; R' is from the group consisting of hydrogen, halogen, carboxyl and sulfonic acid; $n$ is 1 to 2; Z is one of a group consisting of hydrogen and the group represented by the formula

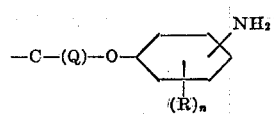

and R" is from the group consisting of hydrogen, halogen, alkyl having 1 to 6 carbons and the corresponding alkoxy groups; $m$ is 1 to 2; and said component Y being one of a group represented by the formulae

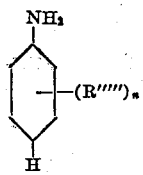

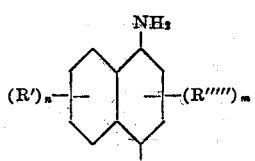

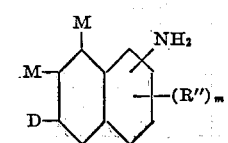

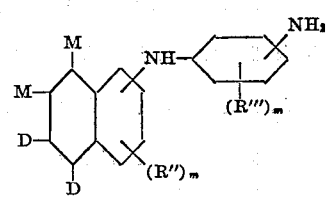

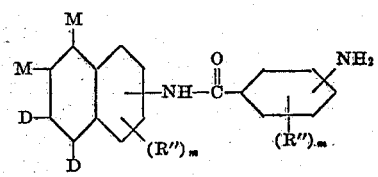

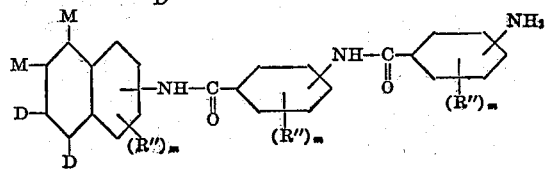

and

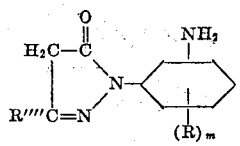

in which —H represents an open coupling position, R''' is one of a group consisting of hydrogen, carboxy and sulfonic acid; R'''' is one of a group consisting of methyl and carboxy; R''''' is one of a group consisting of hydrogen, alkyl and alkoxy; one D is hydroxy and the other is hydrogen; and M which is meta to hydroxy is sulfonic acid and the other is hydrogen, said compound containing at least one solubilizing group.

14. The process which comprises dyeing dyeable fibers with a compound represented by the general formula Y←X→Y, tetrazotizing and coupling on the fiber with an azo dye coupling component which is devoid of solubilizing groups from a group consisting of naphthols, phenylpyrazolones, acylacetarylides and meta-phenylene diamines, said component X being a compound of a group represented by the formulae

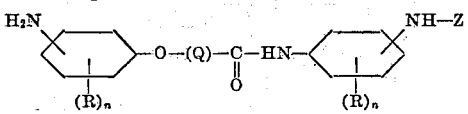

and

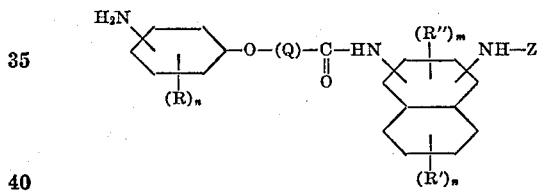

wherein Q represents a radical of the straight and branched chain hydrocarbons containing 1 to 6 carbon atoms in the chain; R is from the group consisting of hydrogen, alkyl having 1 to 6 carbons, the corresponding alkoxy groups carboxy, sulfonic acid, and halogen; R' is from the group consisting of hydrogen, halogen, carboxyl and sulfonic acid; $n$ is 1 to 2; Z is one of a group consisting of hydrogen and the group represented by the formula

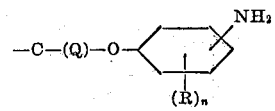

and R" is from the group consisting of hydrogen, halogen, alkyl having 1 to 6 carbons and the corresponding alkoxy groups; $m$ is 1 to 2; and said component Y being one of a group represented by the formulae

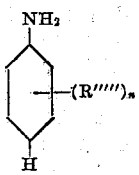

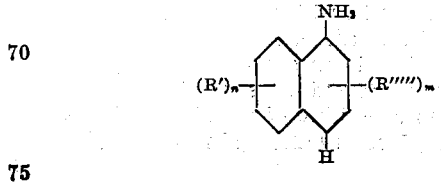

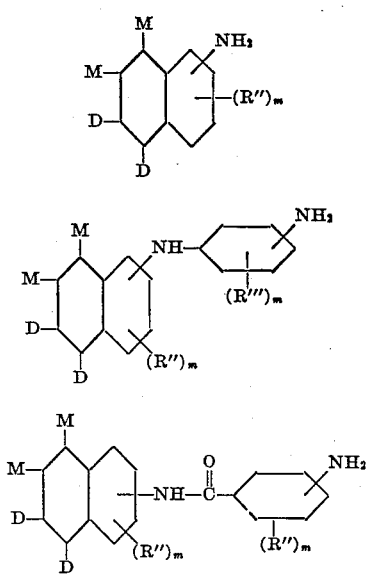
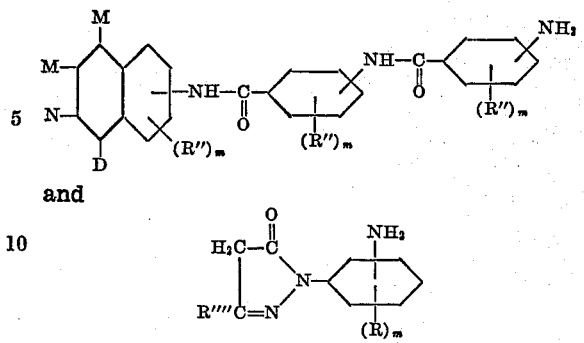

and in which —H represents an open coupling position, R''' is one of a group consisting of hydrogen, carboxy and sulfonic acid; R'''' is one of a group consisting of methyl and carboxyl; R''''' is one of a group consisting of hydrogen, alkyl and alkoxy; one D is hydroxy and the other is hydrogen; and M which is meta to hydroxy is sulfonic acid and the other is hydrogen, said compound containing at least one solubilizing group.

CHILES E. SPARKS.
JAMES W. LIBBY, JR.,

Certificate of Correction

Patent No. 2,266,824. December 23, 1941.

CHILES E. SPARKS ET AL.

It is hereby certified that errors appear in the printed specification of the above numbered patent requiring correction as follows: Page 1, first column, line 54, in the formula, for "HN–Z" read *NH–Z*; second column, line 13, for "hydrocarbon" read *hydrogen*; line 28, for "formula" read *formulae*; page 6, first column, lines 60 to 66, claim 2, for

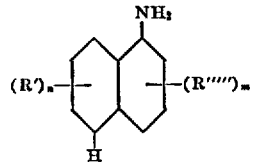

read

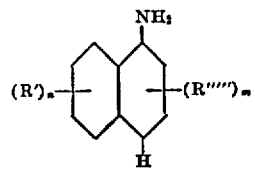

page 8, second column, lines 2 to 7, claim 13, for

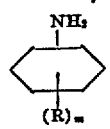

read

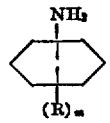

page 9, first column, lines 19 to 22, claim 14, for

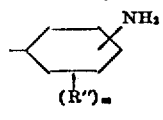

read

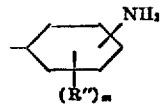

and that the said Letters Patent should be read with these corrections therein that the same may conform to the record of the case in the Patent Office.

Signed and sealed this 3rd day of March, A. D. 1942.

[SEAL]

HENRY VAN ARSDALE,
*Acting Commissioner of Patents.*